(12) United States Patent
Skoff

(10) Patent No.: US 6,892,776 B2
(45) Date of Patent: May 17, 2005

(54) APPARATUS FOR THE AUTOMATIC FILLING OF MOTOR VEHICLE TIRES

(75) Inventor: Gerhard Skoff, Vienna (AT)

(73) Assignee: Steyr-Daimler-Puch Spezialfahrzeug AG & Co. KG, Vienna (AT)

( * ) Notice: Subject to any disclaimer, the term of this patent is extended or adjusted under 35 U.S.C. 154(b) by 0 days.

(21) Appl. No.: 10/453,295

(22) Filed: Jun. 3, 2003

(65) Prior Publication Data

US 2004/0003865 A1 Jan. 8, 2004

(30) Foreign Application Priority Data

Jun. 14, 2002 (AT) .......................... A 906/2002

(51) Int. Cl.⁷ .............................................. B60C 19/00
(52) U.S. Cl. ..................... 152/342.1; 152/415; 340/442
(58) Field of Search ...................... 152/342.1, 340.1, 152/341.1, 415, 416, 418, 419, 426, 427; 340/442–449; 73/146, 146.2, 146.3, 146.8

(56) References Cited

U.S. PATENT DOCUMENTS 3,982,569 A * 9/1976 Gleason et al. ................ 141/5
4,694,409 A * 9/1987 Lehman ...................... 700/282
4,782,878 A * 11/1988 Mittal .......................... 152/417
5,839,801 A * 11/1998 Ferguson ..................... 303/191
6,604,414 B1 * 8/2003 Claussen et al. .............. 73/146
6,615,888 B2 * 9/2003 Elkow ...................... 152/342.1
2003/0164759 A1 * 9/2003 Nantz et al. ................. 340/442

FOREIGN PATENT DOCUMENTS

DE 4232240 A1 * 3/1994 ........... B60C/23/00

* cited by examiner

Primary Examiner—Frantz F. Jules
(74) Attorney, Agent, or Firm—Herbert Dubno

(57) ABSTRACT

A tire-filling system has an electronic control unit response to the tire pressure and the vehicle operating conditions for automatically operating pneumatic tire-filling valves to increase or reduce the tire pressure to setpoint values determined by the electronic control unit and matching the driving conditions. The pressure is delivered from a variable volume source in which a control element increases or decreases the volume. The system can be operated as an open system or a closed system.

16 Claims, 2 Drawing Sheets

APPARATUS FOR THE AUTOMATIC FILLING OF MOTOR VEHICLE TIRES

FIELD OF THE INVENTION

My present invention relates to an apparatus for the automatic filling of motor vehicle tires and to a method of operating it. More particularly, the invention relates to a system for automatically actuating a tire-filling system for the tires of motor vehicles in which sensors determine the tire pressure and a vehicle operating condition and the tire pressure is adjusted through pneumatically-operated valves and the tire pressure can be matched to such conditions as vehicle speed, vehicle loading, roadway conditions, terrain, braking effects and the like.

BACKGROUND OF THE INVENTION

An automatic tire-filling apparatus is described in Austrian patent 408,867 B and the Austrian patent application A 1274/2001. The vehicle speed and the actual tire pressure are measured in the system and a setpoint of the tire pressure is calculated, deviations of the actual value from the setpoint value are determined and based upon those deviations, a filling or emptying valve can be operated to bring the actual tire pressure to the setpoint value.

In general, air is used for this purpose and a compressor is provided to draw the atmospheric air from the ambient atmosphere (i.e. the surroundings), to compress it and to force the air via the pneumatically-actuated valve into the respective tires when the tire pressure is above the setpoint, or is released from the tires through those valves into the surrounding atmosphere.

The critical operating state of such a system for automatic tire pressure control is the filling of the system since for any particular vehicle speed, a tire pressure which is too low may be unsafe. In practice, efforts to utilize a supply reservoir for the filling fluid have proved to be unsatisfactory since in automatic operation, such reservoir could be rapidly depleted and the safety of the vehicle called into question. The result is a problem for management of vehicle systems and could not readily be resolved. As a consequence, closed systems utilizing pressurized storage vessels as the source of the tire-filling fluid have not proved to be highly satisfactory in the past.

OBJECTS OF THE INVENTION

It is, therefore, the principal object of the present invention to provide an improved automatic tire-filling apparatus whereby drawbacks of earlier systems are avoided.

It is also an object of this invention to provide a tire-filling system which can be operated, if desired, as an open system, i.e. one which is not isolated from the atmosphere but which can function as if it utilized a pressure storage reservoir as a source of the tire-charging pressure.

It is also an object to provide a system for the purposes described which can be closed or isolated from the ambient atmosphere.

Still another object of the present invention is to provide a method of operating an automatic tire-filling system or apparatus.

SUMMARY OF THE INVENTION

These objects are achieved, in accordance with the invention by avoiding problems during the critical tire-filling state by providing a control element which can increase or decrease a variable volume and thereby match the tire inner pressure to the setpoint value.

The apparatus and method of the invention can operate without a compressor and can thereby eliminate the noise which the compressor may produce and even the whistling noises of the piping connected to the compressor and which are produced because of the high pressure differential associated with a compressor system. The control element of the invention can quickly change the tire pressure in both directions, i.e. for tire filling and for pressure reduction in a particularly simple and convenient manner.

According to the invention a device for the automatic actuation of a tire-filling apparatus can comprise an electronic controller which, via sensors or with a logic unit determines the driving conditions and the tire pressure of all of the tires and controls pneumatic valves to match the tire pressure to at least such driving conditions as vehicle speed, vehicle loading, road conditions and terrain, wherein a control element is provided for increasing and decreasing a variable volume for the apparatus, thereby matching internal tire pressure to a setpoint value therefor as determined by the controller.

In other words the tire-filling apparatus can include:

a source of a fluid under pressure;

respective pneumatic valves for the tires actuatable to control an internal tire pressure thereof and connected between the source and the respective tire;

an electronic controller provided with inputs representing an actual pressure of the tires and at least one driving condition including vehicle speed, vehicle loading, road conditions and terrain, and determining setpoint pressures for the tires, the electronic controller having an output for operating the valves; and a control element connected to the source for increasing and decreasing a variable volume for the apparatus, thereby matching internal tire pressure to a setpoint pressure therefor as determined by the controller.

The control element can include a piston displaceable in a cylinder and the variable volume can be enclosed in a gas-tight flexible envelope. The control element can alternatively or in addition include an electric motor, preferably a stepping motor which can be connected to a piston via a piston rod and a transmission. The apparatus can have a valve connected to the fluid line, i.e. the fluid pipe is operated by the controller and enabling ambient air to be drawn into the system to compensate for leakage therefrom and replenish a significant pressure loss in the case, for example, of a defective tire. The system can be operated as an open or closed system as will be detailed below.

The method of operating the apparatus can comprise the steps of:

a) measuring an internal tire pressure at each of the tires;

b) determining at least one operating condition of the vehicle;

c) logically combining measurements of internal tire pressure and information with respect to an operating condition of such vehicle to determine a setpoint pressure for each of the tires;

d) generating a pressure by displacing a control element for increasing and decreasing variable volume; and e) applying the pressure generated in step (d) to the tire until the setpoint is reached or venting excess pressure from the tires until the setpoint pressure is reached.

The system of the invention, in which the gas volume of the tires of the vehicle and a variable volume in a reservoir connected to the tires by pneumatic valves can have that variable volume altered by a control element has significant advantages over compressor-operated systems.

For example, in the case of a closed system, other gases than air can be used, including special tire-filling gases which can have their composition selected to optimize the technological operation of the tire and the comfort properties thereof. In the case of a closed system, moreover, the air dryer utilized for a compressor system and its additional gas and the space required for it can be eliminated.

With the system of the invention, the valving can be greatly simplified and noise produced upon venting of air from the tires can be minimized. Compressor noise, of course, is eliminated. Time delays in increasing and decreasing tire pressure are avoided as well, since the compressor need not, for example, be started up against a high counterpressure.

However, in the case of a closed system, a drawback may arise which can readily be compensated in accordance with the invention. Slight leakage can be expected for any pneumatic system because of the numerous connections, valves and seals. The closed system is thus not free from the need to compensate such leakage by drawing in fresh air from the exterior. Leakage losses which may exceed the reserve of the supply volume can be made up from a simply replaced cartridge which can contain liquefied tire-filling gas and which is connected by a valve with the system so that, should the amount of gas in the closed system fall below a critical level, this valve can open and automatically restore the system to a full state.

In an emergency situation, a normally closed valve can open to allow external air to be drawn in. There can as well be an increase in the variable volume of the cylinder.

This ability to draw air into the system can apply both in the case of the open and in the case of the closed system for the situation in which a defective tire may cause a sudden pressure drop or in the case of a closed system where the supply cartridge may be empty and there may be a demand for an additional volume of tire-filling gas.

It has been found to be an important feature of the invention that the lines which may supply the tire valves be discharged or depressurized to prevent, for example, the pneumatically-controlled valves from opening in an undesired manner. In that case, an appropriately dimensioned pneumatic cylinder may be provided to take up the volume of gas in the piping system which must be removed to bring the pressure therein to a atmospheric pressure. This eliminates the fluctuation of the pressure in the piping system between ambient pressure and that which may be sufficient to open the tire valves.

In an open system, of course, this can be achieved simply by venting the pipe to the ambient atmosphere.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
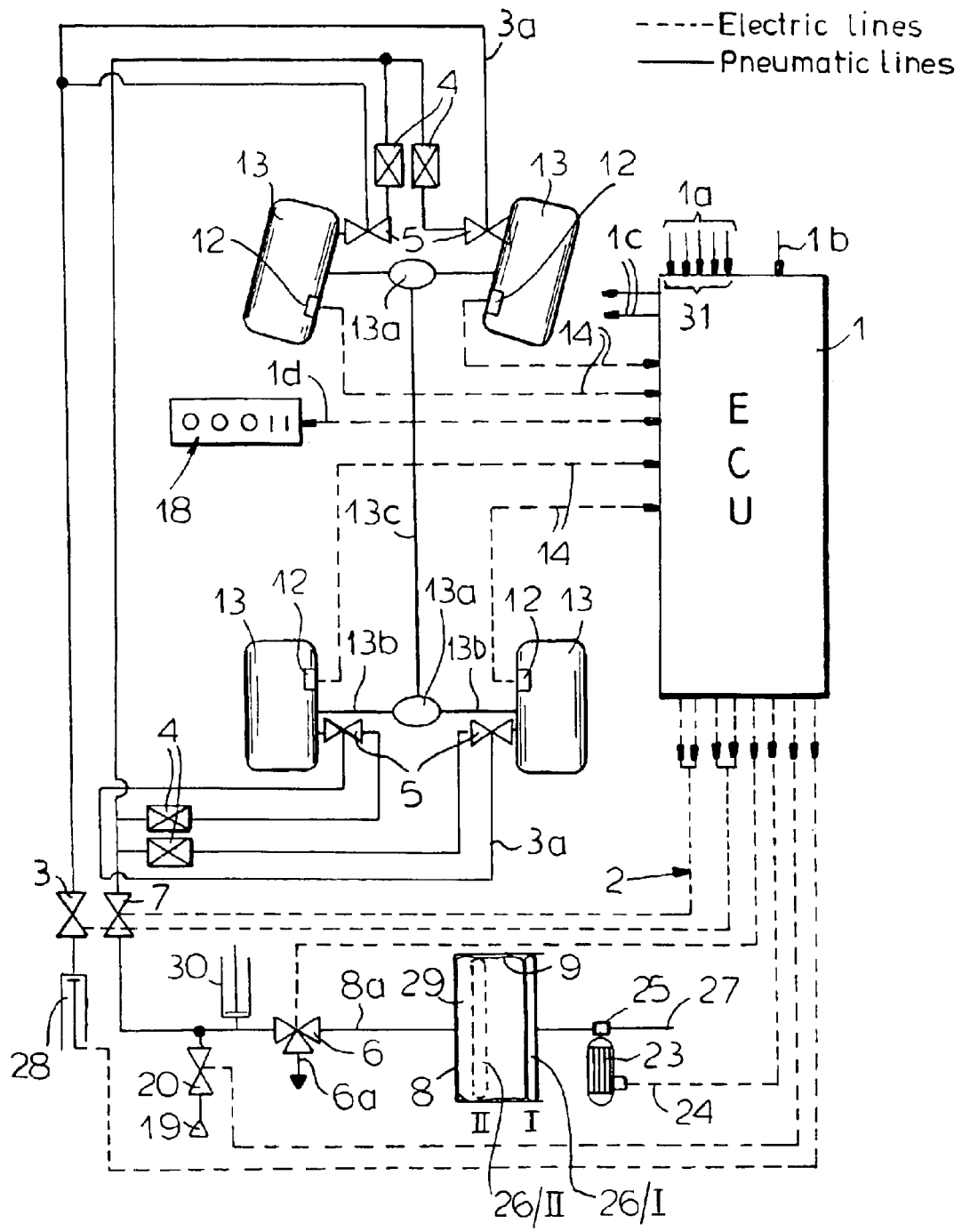
FIG. 1 is a schematic diagram of an open system embodying the invention.
Figure 2:
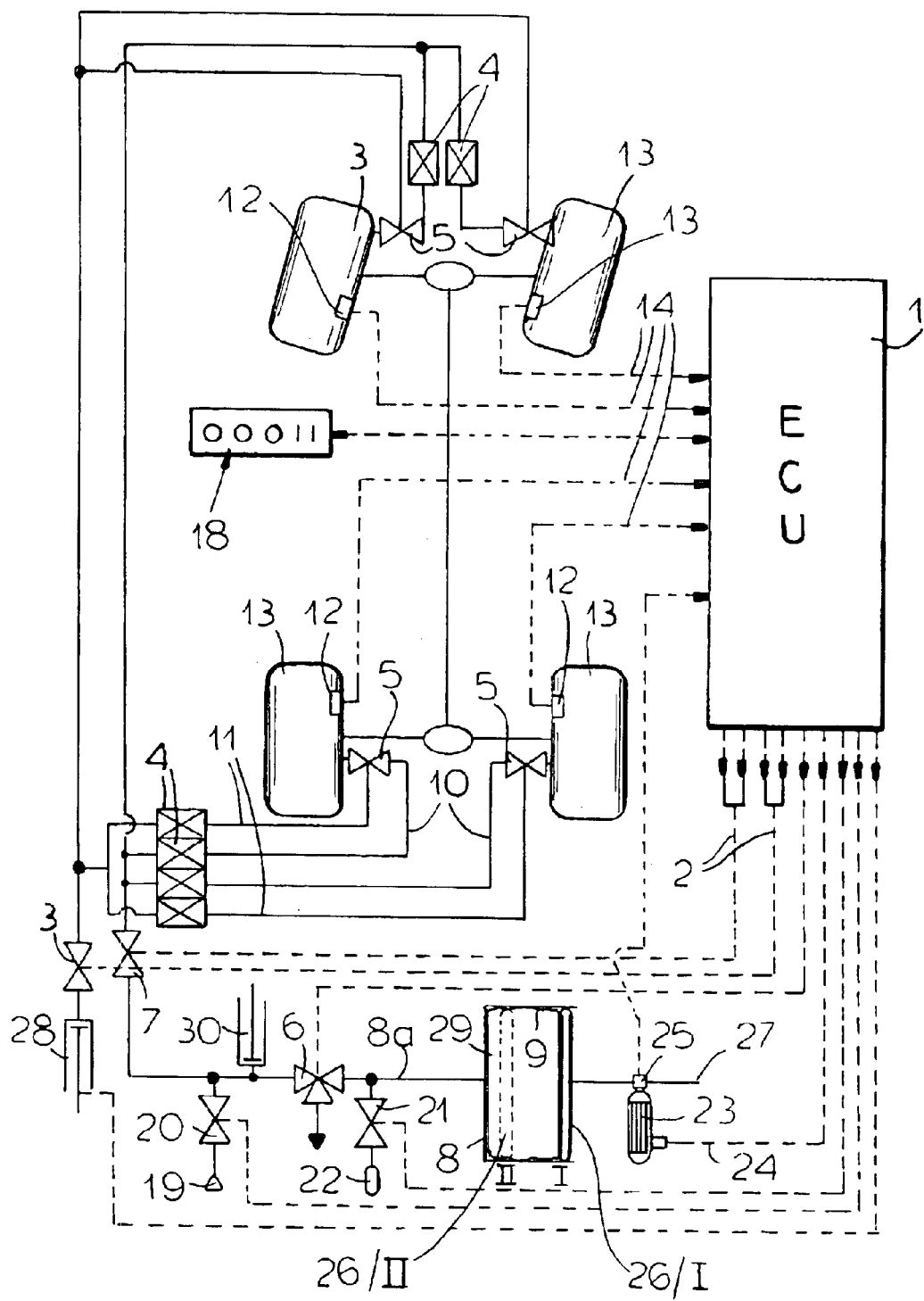
FIG. 2 is a schematic diagram of a closed system, isolated from the atmosphere and embodying the invention in accordance with a variant thereof.

In both FIGS. 1 and 2, electric lines are represented generally by broken lines and also represent control signal transmissions. Pneumatic lines are usually solid lines.

In FIG. 1 I have shown an electronic control unit 1 which may contain a computer or central processor unit, a memory, logic circuitry or the like and can have a plurality of inputs represented at 1a from sensors of vehicle operating conditions including, for example, vehicle speed, vehicle braking, vehicle load, road conditions and orientation of the vehicle, and information as to terrain.

At least one further input 1b can be provided to program the electronic control unit and outputs 1c can be provided to monitoring peripherals. The electronic control unit, as will be discussed in greater detail hereinafter, receives inputs on lines 14 from respective sensors 12 for the tire pressure and has a data line 1d which runs to a display 18 which can be provided on the dashboard.

The electronic control unit has outputs 2 which also will be discussed in greater detail. The outputs 2 control a valve 3 which can connect an auxiliary pressure source 28 to control lines 3a for pneumatic pilots of the pneumatic valves 5 which serve to fill the tires. A tire-filling valve is provided at 7 and is controlled by another output 2 from the electronic control unit 1 to connect a fluid pressure source as represented by the line 8a with sealing packets 4 and the valves 5, thereby providing the fluid under pressure which can be used to fill the tires to attain the setpoint pressures.

The term "sealing packet" as used to refer to elements 4 is intended to describe the rotary seals between the parts and system rotating with the tires and the parts of the system which are stationary, the tire-inflating gas and the pneumatic piloting signal being delivered through the sealing packet to the wheel and the tire-filling valve 5 rotating therewith.

The line 8a can include a three-way valve 6, one port of which can be connected at 6a to some other system for pressurizing the same. The fluid pressure source can include a cylinder 8 and a piston 9 which will be described in greater detail hereinafter. The lines delivering the fluid under pressure to the tires and hence to the valves 5 are represented at 10.

The tires 13 of the respective cylinders are driven from differentials 13a by respective axles 13b from a drive shaft 13c. The engine driving this shaft has not been shown.

The tire pressure control system shown in FIG. 1 is intended for common control of all of the four cylinders illustrated although other connections are possible with duplication, for example of the valves 3 and 7. For instance, two cylinders can be coupled for joint tire pressure control and thus separate control can be provided for each axle or the four wheels can be individually controlled or wheels on a different axle can be individually controlled, controlled-pairwise or controlled together with the wheels which have been illustrated.

In any case the control is effected by the central electronic control unit 1 coupled logically with the sensor system 12 by means of which the tire pressure can e provided as an input to the electronic control unit, other inputs being provided at 1a of vehicle travel conditions collectively represented at 31. These conditions can be degree of loading of the vehicle, the vehicle speed and the braking vehicle speed and travel conditions monitoring has been described in detail in Austrian patent 408,867 or in the Austrian patent application A 1274/2001. Tire pressure monitoring is state of the art.

The logic system and CPU of the electronic control unit 1 is respective to the pressure and travel conditions so that, where a pressure increase is required because the pressure in a tire is found to be below that determined by the logic circuitry or programming, the electromagnetically-operated control valve 3 will be opened by a signal from the electronic control unit 1. Simultaneously a control element 28, for example a pneumatic cylinder, is actuated by one of the outputs 2 of the ECU 1 so that the pressure in the control lines 3a is increased to pilot the valves 5 and cause them to open. From the ECU 1 a signal is delivered as well to the filling valve 7 and the variable volume source is operated. In this case the control element 23 is an electric motor which is driven by the signal on line 24 from the ECU 1 to displace the rod 27 via the transmission 25 and actuate the piston 26 to shift that piston from position I to position II in the piston-and-cylinder unit 8, 9. The volume 29 in the cylinder 8 is reduced and the gas in lines 10 is compressed to drive the fluid into the tires 13 through the open valves 5. The volume 29 is preferably in a flexible envelope which can be composed of hermetically sealed fabric or a plastic foil which can fold as the piston 26 advances to the left and which simplifies sealing of the piston 26 with respect to the cylinder 8.

Since the volume of the tires is very large by comparison to the internal volume of the filling lines 10 and the pressure change in the tires is relatively slow, the measurement of the internal pressure of the tires can be effected in a quasistatic manner and thus by measurement only of the static pressure component of the gas to yield an accurate value of the internal tire pressure.

Each tire 13 can be provided with an electronic pressure sensor system which includes a pressure sensor unit and can transmit an electrical signal via a respective signal line 14 to the central control unit 1. When the setpoint pressure is reached in the respective tire 13, the logic circuitry or the CPU of the electronic control unit 1 so operates the actuator 28 and the piston rod 27 or the drive 25 to reduce the pressure in lines 3a and in line 10 so that the wheel valves 5 close and the lines 10 are depressurized. Electronic signals are transmitted to the control and filling valves 3 and 7 to cut off the further feed to lines 3a and via the sealing packets 4, to the lines 10.

Should there be a pressure drop in one or more of the tires or in the control system for the tires detected by pressure sensors and compared with the value determined by the electronic control unit for the particular state of vehicle operations, the output of the electronic control unit 1 can open the electromagnetically actuated control valve 3. The control element 28, which is preferably a pneumatic cylinder, can then be actuated to raise the pressure in lines 3a and open the tire valve 5. The filling valve 7 can then be actuated and the setting element 23, which is an electric motor as noted, can be operated to shift the piston 26 from position II to position I and increase the volume 29 in the cylinder 8. This displacement of the piston is effected by the motor 23 through the transmission 25 and the rod 27.

The pressure of the gas in lines 10 and thus in the tires 13 is thereby reduced. When the setpoint pressure for the tires is reached, the actuator 28 lowers the pressure in control lines 3a to close the valves 5. Simultaneously the control and filling valve 3 and 7 are closed.

The three-way valve 6 is open in both of these functions to allow the pressure from the cylinder 8 to be delivered to the valve 7. The valve 6 has only the purpose of providing the fluid pressure from the variable volume 29 and the cylinder 8 for some other system, for example, a gas suspension or spring.

The control element 28 can reduce the pressure in lines 3a to atmospheric pressure following the tire pressure modification. The lines 10, referred to herein as filling lines, can be relieved or vented in the open system of FIG. 1 while the tire valves 5 are closed through the venting valve 20 and the sound damper while the valve 7 is still open or by opening of the valve 7 by the electronic control unit 1.

FIG. 2 shows the system of FIG. 1 modified for use as a closed system and the parts having the same reference characters from those of FIG. 1 are the same parts and function in a similar way. In this case, however, the "venting" of the fluid piping system 10, 11 cannot be effected directly to the atmosphere but must be afforded by a separate venting system. One possible separate venting system is the piston and cylinder unit 30 which can be connected to the line 8a and is analogous to control element 28 previously described and has a volume into which the gas can be discharged and a piston which can be displaced to allow variation of the volume of gas accommodated in the unit 30. In this embodiment the reference numeral 11 has been used to refer to the network of lines 3a providing the piloting of the tire valves 5. The unit 30 may have a capacity equal to the pipe line volume of the filling lines 10 for reduction of the pressure therein to ambient pressure. By the control and opening of the filling valve 7 and a movement of the piston 26 from position II to position I while the tire valves 5 remain closed, the pressure in the lines 10, especially in the rotary feed-through or rotary feed-through seal 4 can be lowered in a similar manner.

A display 18 is provided in FIGS. 1 and 2, whereby the driver is informed of the current state of the tires. The system can also include an alarm to alert the operator of a tire defect or maximum vehicle speed based upon the vehicle load and the pressure condition of the tires.

Leakage losses are readily compensated by a shift of the piston 26 from position II to position I while valve 20 is opened and valve 7 is closed to allow ambient air to be drawn into the system (FIG. 1).

In the closed system of FIG. 2 which can operate with a gas other than ambient air, for example, a specially prepared tire inflation gas, a readily replaceable cartridge 22 containing liquefied or compressed tire inflation gas which is the same as that in the closed system, can be attached through a valve 21. When there is an excessive pressure drop in the closed system, the valve 21 is automatically opened to refill the system from the cartridge.

Should there be a sudden pressure drop in the system resulting from a defective tire, valve 20 can be opened to allow ambient air to be drawn into the system by a displacement of the piston 26. This can occur as well should the supply cartridge 22 be empty.

I claim:

1. A compressor-free device for the automatic actuation of a tire-filling apparatus for motor vehicles, comprising an electronic controller which, via sensors or with a logic unit determines the driving conditions and the tire pressure of all of the tires and controls pneumatic valves to match the tire pressure to at least such driving conditions as vehicle speed, vehicle loading, road conditions and terrain, wherein a control element is provided for increasing and decreasing a variable supply volume of a piston-and-cylinder arrangement for taking up air and supplying air for said apparatus, thereby matching internal tire pressure to a setpoint value therefor as determined by said controller, said piston-and-cylinder arrangement being the sole source of air for said tires in automatic operation of the apparatus.

2. The tire-filling apparatus defined in claim 1 wherein the tire-filling apparatus is provided with a system of fluid lines between said source and said valves and said system is operable as a closed system disconnected from the ambient atmosphere.

3. The tire-filling apparatus defined in claim 1 wherein said pneumatic valves are fed by at least one filling valve through respective sealing packets and respective filling lines.

4. The tire-filling apparatus defined in claim 3 wherein said pneumatic valves are operated by respective control lines pressurized and vented by a separate pressurization element.

5. A compressor-free tire-filling apparatus for a motor vehicle having tires pressurizable with a fluid, said apparatus comprising:
   a source of a fluid under pressure in the form of a cylinder containing a variable supply volume of the fluid;
   respective pneumatic valves for said tires actuatable to control an internal tire pressure thereof and connected between said source and the respective tire;
   an electronic controller provided with inputs representing an actual pressure of said tires and at least one driving condition including vehicle speed, vehicle loading, road conditions and terrain, and determining setpoint pressures for said tires, said electronic controller having an output for operating said valves; and
   a control element connected to said source for increasing and decreasing a variable volume for said apparatus, thereby matching internal tire pressure to a setpoint pressure therefor as determined by said controller.

6. The tire-filling apparatus defined in claim 5 wherein said variable volume is enclosed in a gas-tight envelope.

7. The tire-filling apparatus defined in claim 6 wherein said control element includes an electric motor.

8. The tire-filling apparatus defined in claim 7 wherein said electric motor is a stepping motor.

9. The tire-filling apparatus defined in claim 7 wherein said control element includes a transmission.

10. A tire-filling apparatus for a motor vehicle having tires pressurizable with a fluid, said apparatus comprising:
    a source of a fluid under pressure;
    respective pneumatic valves for said tires actuatable to control an internal tire pressure thereof and connected between said source and the respective tire;
    an electronic controller provided with inputs representing an actual pressure of said tires and at least one driving condition including vehicle speed, vehicle loading, road conditions and terrain, and determining setpoint pressures for said tires, said electronic controller having an output for operating said valves;
    a control element connected to said source for increasing and decreasing a variable volume for said apparatus, thereby matching internal tire pressure to a setpoint pressure therefor as determined by said controller;
    a system of fluid lines between said source and said valves; and
    another valve connected to said lines, operated by said controller and enabling ambient air to be drawn into said system to compensate leakage therefrom and replenish a significant pressure loss in a tire.

11. A tire-filling apparatus for a motor vehicle having tires pressurizable with a fluid, said apparatus comprising:
    a source of a fluid under pressure;
    respective pneumatic valves for said tires actuatable to control an internal tire pressure thereof and connected between said source and the respective tire;
    an electronic controller provided with inputs representing an actual pressure of said tires and at least one driving condition including vehicle speed, vehicle loading, road conditions and terrain, and determining setpoint pressures for said tires, said electronic controller having an output for operating said valves;
    a control element connected to said source for increasing and decreasing a variable volume for said apparatus, thereby matching internal tire pressure to a setpoint pressure therefor as determined by said controller;
    a system of fluid lines between said source and said valves and said system is operable as a closed system disconnected from the ambient atmosphere;
    replaceable fluid pressure cartridge; and
    a further valve operated by said controller and connecting said cartridge to said system upon detection of a critical filling state of said system, whereby said closed system is automatically restored to a setpoint filling state.

12. The tire-filling apparatus defined in claim 11, further comprising a three-way valve connected to said system and having a port through which another system can be supplied with pressurized gas.

13. The tire-filling apparatus defined in claim 11, further comprising a vent connectable to said closed system and enabling a variable volume corresponding at least to a volume of said lines to be vented from said system.

14. The tire-filling apparatus defined in claim 11 wherein said electronic controller is connectable to at least one control valve for piloting said pneumatic valves and at least one filling valve for supplying fluid under pressure to said pneumatic for delivery to the respective tire.

15. A device for the automatic actuation of a tire-filling apparatus for motor vehicles, comprising an electronic controller which, via sensors or with a logic unit determines the driving conditions and the tire pressure of all of the tires and controls pneumatic valves to match the tire pressure to at least such driving conditions as vehicle speed, vehicle loading, road conditions and terrain, wherein a control element is provided for increasing and decreasing a variable volume for said apparatus, thereby matching internal tire pressure to a setpoint value therefor as determined by said controller, said pneumatic valves being fed by at least one filling valve through respective sealing packets and respective filling lines, said pneumatic valves being operated by respective control lines pressurized and vented by a separate pressurization element in the form of a pneumatic cylinder.

16. A method of operating a tire-filling apparatus for a motor vehicle having tires pressurizable with a fluid, comprising the steps of:
    a) measuring an internal tire pressure at each of said tires;
    b) determining at least one operating condition of the vehicle;
    c) logically combining measurements of internal tire pressure and information with respect to an operating condition of such vehicle to determine a setpoint pressure for each of said tires;
    d) generating a pressure exclusively by displacing a piston in a cylinder for increasing and decreasing variable volume; and
    e) applying the pressure generated in step (d) to each of said tires until said setpoint is reached or venting excess pressure from each of said tires until said setpoint pressure is reached.

* * * * *